(12) United States Patent
Li et al.

(10) Patent No.: US 10,170,031 B2
(45) Date of Patent: Jan. 1, 2019

(54) DISPLAY APPARATUS

(71) Applicant: BOE TECHNOLOGY GROUP CO., LTD., Beijing (CN)

(72) Inventors: Wenbo Li, Beijing (CN); Yong Qiao, Beijing (CN); Xinyin Wu, Beijing (CN); Pan Li, Beijing (CN); Jianbo Xian, Beijing (CN); Hongfei Cheng, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 25 days.

(21) Appl. No.: 14/912,464

(22) PCT Filed: May 19, 2015

(86) PCT No.: PCT/CN2015/079324
§ 371 (c)(1),
(2) Date: Feb. 17, 2016

(87) PCT Pub. No.: WO2016/107053
PCT Pub. Date: Jul. 7, 2016

(65) Prior Publication Data
US 2016/0351106 A1 Dec. 1, 2016

(30) Foreign Application Priority Data
Jan. 4, 2015 (CN) .................... 2015 2 0003223 U (51) Int. Cl.
*G09G 5/00* (2006.01)
*G09G 3/20* (2006.01)
(Continued)

(52) U.S. Cl.
CPC ....... *G09G 3/2092* (2013.01); *G02F 1/13452* (2013.01); *G09G 3/36* (2013.01); *G09G 2310/08* (2013.01); *G09G 2330/02* (2013.01)

(58) Field of Classification Search
CPC ............ G02F 1/13452; G09G 2310/08; G09G 2330/02; G09G 3/2092; G09G 3/36
See application file for complete search history.

(56) References Cited

U.S. PATENT DOCUMENTS

| 6,411,359 B1 | 6/2002 | Kobayashi et al. |
| 9,087,474 B2 | 7/2015 | Seong et al. |

(Continued)

FOREIGN PATENT DOCUMENTS

| CN | 101645246 A | 2/2010 |
| CN | 102110404 A | 6/2011 |

(Continued)

OTHER PUBLICATIONS

International Search Report of PCT/CN2015/079324 in Chinese, dated Oct. 9, 2015 with English translation.

(Continued)

*Primary Examiner* — Insa Sadio
(74) *Attorney, Agent, or Firm* — Collard & Roe, P.C.

(57) ABSTRACT

A display apparatus comprises a T/CON functional module for providing a timing control, wherein the T/CON functional module and at least one other functional module in the display apparatus are integrated into one printed circuit board, so that the integration of printed circuit boards is improved, the number of peripheral circuit boards and lead wires of the display apparatus is decreased, and the manufacturing cost of the display apparatus is reduced.

10 Claims, 5 Drawing Sheets

(51) Int. Cl.
*G09G 3/36* (2006.01)
*G02F 1/1345* (2006.01)

(56) References Cited

U.S. PATENT DOCUMENTS

| | | | |
|---|---|---|---|
| 2003/0197663 A1* | 10/2003 | Lee .................. | G09G 3/3233 345/76 |
| 2004/0095342 A1* | 5/2004 | Lee .................. | G09G 3/3696 345/211 |
| 2008/0001894 A1* | 1/2008 | Oh ................... | G09G 3/3677 345/98 |
| 2011/0157103 A1 | 6/2011 | Chen et al. | |

FOREIGN PATENT DOCUMENTS

| | | |
|---|---|---|
| CN | 103050101 A | 4/2013 |
| CN | 204302618 U | 4/2015 |

OTHER PUBLICATIONS

Notice of Transmittal of the International Search Report of PCT/CN2015/079324 in Chinese, dated Oct. 9, 2015.
Written Opinion of the International Searching Authority of PCT/CN2015/079324 in Chinese, dated Oct. 9, 2015 with English translation.

\* cited by examiner

DISPLAY APPARATUS

CROSS REFERENCE TO RELATED APPLICATIONS

This application is the National Stage of PCT/CN2015/079324 filed on May 19, 2015, which claims priority under 35 U.S.C. § 119 of Chinese Application No. 201520003223.3 filed on Jan. 4, 2015, the disclosure of which is incorporated by reference.

TECHNICAL FIELD

The present disclosure relates to a display apparatus.

BACKGROUND

A Liquid Crystal Display (LCD) has features of low power consumption, low radiation, low manufacturing cost and so on, and has been widely applied in various electronic devices, for example, digital electronic devices such as display apparatuses, TV sets, mobile phones, digital cameras and so on. A LCD mainly includes a display panel and signal boards, which provide signals for the display panel, such as a system board, a Print Circuit Board (PCB) for transmitting driving signals for driving an integrated circuit (IC), a timing controller (T/CON) realizing the timing control, a power supply board providing operating voltages and so on.

Presently, respective signal boards in the display apparatus are arranged on different carriers and are electrically connected with each other via Flexible Printed Circuit boards (FPCs) or lead wires, which results in that the number of the peripheral circuit boards and lead wires of the display apparatus is too large and that the cost is high.

SUMMARY OF THE DISCLOSURE

At least one embodiment of the present disclosure provides a display apparatus which can solve the problem in existing display apparatuses that the number of the peripheral circuit boards and lead wires of the display apparatus is too large and the cost is high due to respective signal boards being connected with each other via FPCs or wires.

At least one embodiment of the present disclosure provides a display apparatus comprising a T/CON functional module for providing the timing control, wherein the T/CON functional module and at least one other functional module in the display apparatus are integrated into one printed circuit board.

As a first implementation, the at least one other functional module comprises a first functional module for providing signals for a gate line drive IC; wherein a second functional module for providing signals for a data line drive IC and a system functional module for driving the T/CON functional module in the display apparatus are electrically connected with the T/CON functional module on the printed circuit board.

As a second implementation, the at least one other functional module comprises a second functional module for providing signals for a data line drive IC; wherein a first functional module for providing signals for a gate line drive IC and a system functional module for driving the T/CON functional module in the display apparatus are electrically connected with the T/CON functional module on the printed circuit board.

As a third implementation, the at least one other functional module comprises a system functional module for driving the T/CON functional module; wherein a first functional module for providing signals for a gate line drive IC and a second functional module for providing signals for a data line drive IC in the display apparatus are electrically connected with the T/CON functional module on the printed circuit board.

As a fourth implementation, the at least one other functional module comprises a power functional module for providing operating voltages; wherein a first functional module for providing signals for a gate line drive IC, a second functional module for providing signals for a data line drive IC and a system functional module for driving the T/CON functional module in the display apparatus are electrically connected with the T/CON functional module on the printed circuit board.

As a fifth implementation, the at least one other functional module comprises a first functional module for providing signals for a gate line drive IC and a second functional module for providing signals for a data line drive IC; wherein a system functional module for driving the T/CON functional module in the display apparatus is electrically connected with the T/CON functional module on the printed circuit board.

As a sixth implementation, the at least one other functional module comprises a system functional module for driving the T/CON functional module and a power functional module for providing operating voltages; wherein a first functional module for providing signals for a gate line drive IC and a second functional module for providing signals for a data line driving IC in the display apparatus are electrically connected with the T/CON functional module on the printed circuit board respectively.

As a seventh implementation, the at least one other functional module comprises a first functional module for providing signals for a gate line drive IC, a system functional module for driving the T/CON functional module and a power functional module for providing operating voltages; wherein a second functional module for providing signals for a data line drive IC in the display apparatus is electrically connected with the T/CON functional module on the printed circuit board.

As an eighth implementation, the at least one other functional module comprises a second functional module for providing signals for a data line drive IC, a system functional module for driving the T/CON functional module and a power functional module for providing operating voltages; wherein a first functional module for providing signals for a gate line drive IC in the display apparatus is electrically connected with the T/CON functional module on the printed circuit board.

As a ninth implementation, the at least one other functional module comprises a first functional module for providing signals for a gate line drive IC, a second functional module for providing signals for a data line drive IC, a system functional module for driving the T/CON functional module and a power functional module for providing operating voltages.

In at least one embodiment of the present disclosure, the T/CON functional module for providing the timing control in the display apparatus and at least one other functional module in the display apparatus are integrated into one printed circuit board, which improves the integration of circuit boards, decreases the numbers of printed circuit boards and lead wires, and thus reduces the manufacturing cost of the display apparatus.

DETAILED DESCRIPTION

By integrating a T/CON functional module for providing the timing control in a display apparatus and at least one other functional module in the display apparatus into one printed circuit board, the present disclosure improves the integration of circuit boards, decreases the number of at least one of FPCs, lead wires and printed circuit boards, and thus reduces the manufacturing cost of the display apparatus.

In the following, embodiments of the present disclosure will be described in details in combination with the attached drawings. It should be understood that embodiments described herein are only for illustrating and explaining the present disclosure, but not for limiting the present disclosure.

Figure 1:
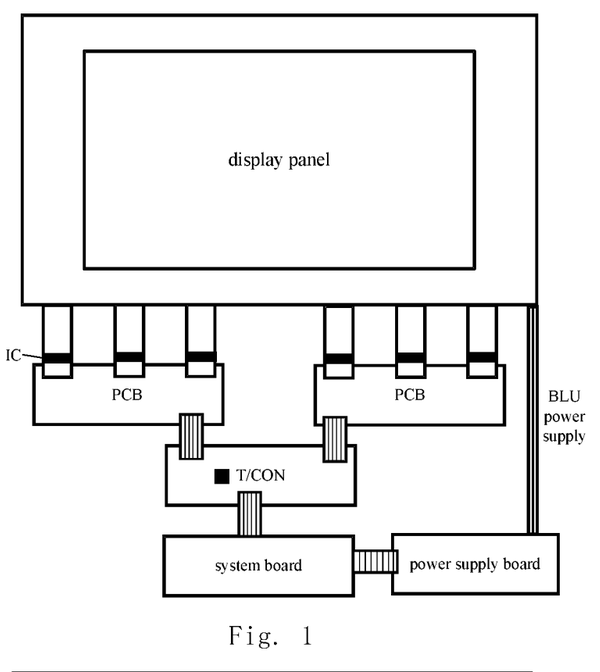
FIG. 1 is a schematic diagram of a structure of a known display apparatus.

FIG. 1 is a schematic diagram of the structure of a known display apparatus. As illustrated in FIG. 1, respective signal boards in the display apparatus are arranged on different carriers and are electrically connected with each other via FPCs or lead wires.

A display apparatus provided by the present disclosure includes a T/CON functional module for providing the timing control, wherein the T/CON functional module and at least one other functional module in the display apparatus are integrated into one printed circuit board.

In the present disclosure, the T/CON functional module for providing the timing control in the display apparatus and at least one other functional module in the display apparatus are integrated into one printed circuit board, which improves the integration of circuit boards, decreases the number of FPCs and lead wires, and thus reduces the manufacturing cost of the display apparatus.

Figure 2:
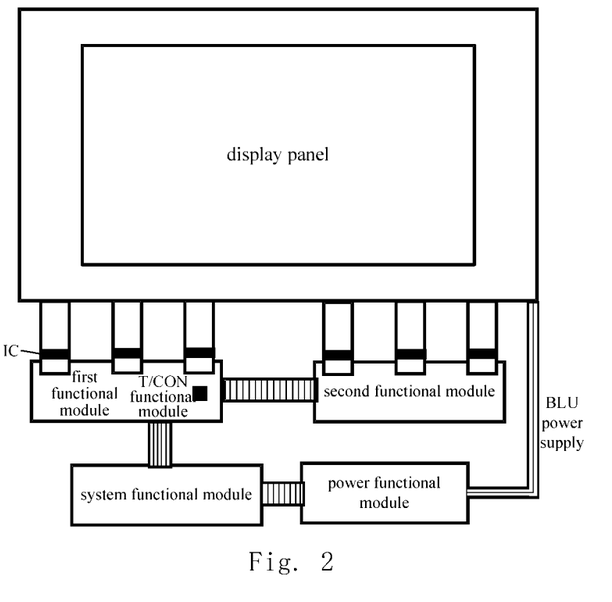
FIG. 2 is a schematic diagram of the structure of a first display apparatus provided by an embodiment of the present disclosure.

FIG. 2 is a schematic diagram of the structure of a first display apparatus provided by an embodiment of the present disclosure. As a first implementation, as illustrated in FIG. 2, the at least one other functional module includes a first functional module for providing signals for a gate line drive IC.

A second functional module for providing signals for a data line drive IC and a system functional module for driving the T/CON functional module in the display apparatus are electrically connected with the T/CON functional module on the printed circuit board.

In this way, the T/CON functional module and the first functional module for providing the signals for the gate line drive IC in the display apparatus are integrated into one printed circuit board, so that there is no need to establish a connection via any FPC between the T/CON functional module and the first functional module, improving the reliability. The number of peripheral circuit boards of the display apparatus is decreased and the length of the power supply line from the display panel of the display apparatus to the Black Light Unit (BLU) of a power functional module is shorten as compared with the known solution in which the T/CON functional module and the first functional module are respectively arranged on different carriers, for example, arranged on different printed circuit boards.

In this way, the second functional module for providing the signals for the data line drive IC, the system functional module for driving the T/CON functional module and the power functional module for providing operating voltages in the display apparatus are arranged on the carriers other than the printed circuit board. For example, the second functional module, the system functional module and the power functional module are arranged on different printed circuit boards respectively.

Of course, the arrangement of the second functional module, the system functional module and the power functional module is not limited to the above way but may be in other ways. For example, the second functional module for providing the signals for the data line drive IC is arranged on another printed circuit board while the system functional module for driving the T/CON functional module and the power functional module for providing the operating voltages are arranged on the backboard of the display apparatus.

Figure 3:
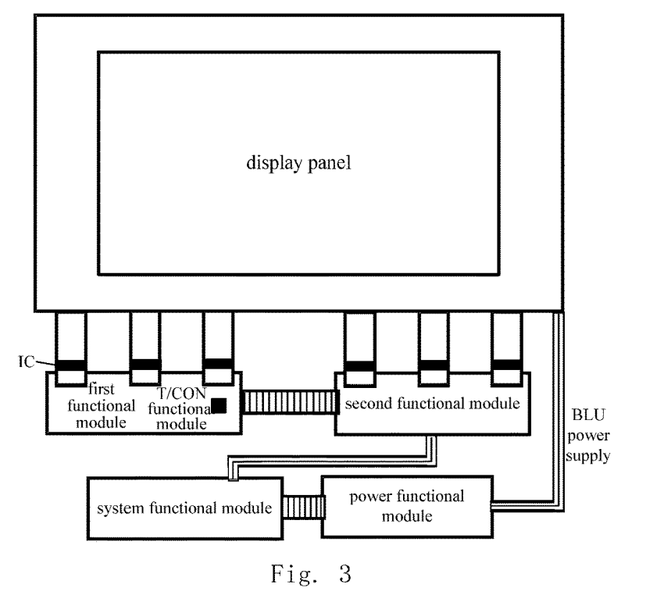
FIG. 3 is a schematic diagram of the structure of a second display apparatus provided by an embodiment of the present disclosure.

FIG. 3 is a schematic diagram of the structure of a second display apparatus provided by an embodiment of the present disclosure. As a second implementation, as illustrated in FIG. 3, the at least one other functional module includes a second functional module for providing signals for a data line drive IC.

A first functional module for providing signals for a gate line drive IC and a system functional module for driving the T/CON functional module in the display apparatus are electrically connected with the T/CON functional module on the printed circuit board respectively.

In this way, the T/CON functional module and the second functional module for providing the signals for the data line drive IC in the display apparatus are integrated into one printed circuit board, so that there is no need to establish a connection via any FPC between the T/CON functional module and the second functional module, improving the reliability. The number of peripheral circuit boards of the display apparatus is decreased and the length of the power supply line from the display panel of the display apparatus to the BLU of a power functional module is shorten as compared with the known solution in which the T/CON functional module and the second functional module are respectively arranged on different carriers.

In this way, the first functional module for providing the signals for the gate line drive IC, the system functional module for driving the T/CON functional module and the power functional module for providing operating voltages in the display apparatus are arranged on different printed circuit boards.

Of course, the arrangement of the first functional module, the system functional module and the power functional module is not limited to the above way but may be in other ways. For example, the first functional module for providing the signals for the gate line drive IC is arranged on another printed circuit board while the system functional module for driving the T/CON functional module and the power functional module for providing the operating voltages are arranged on the backboard of the display apparatus.

Figure 4:
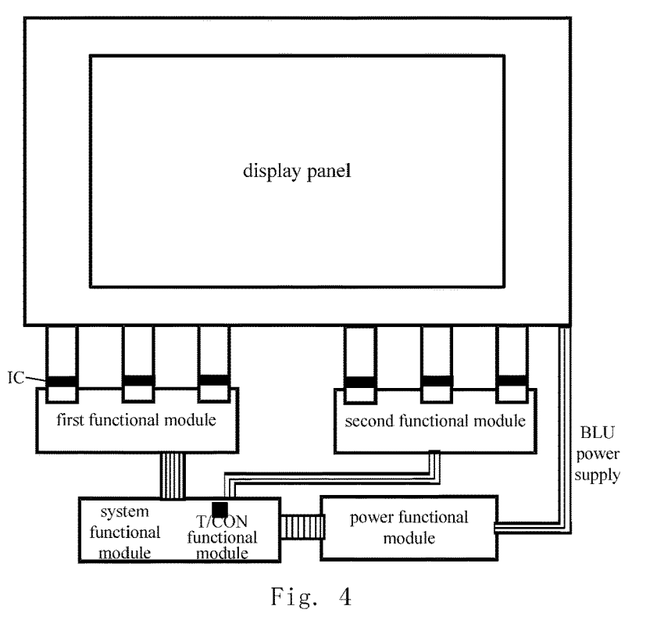
FIG. 4 is a schematic diagram of the structure of a third display apparatus provided by an embodiment of the present disclosure.

FIG. 4 is a schematic diagram of the structure of a third display apparatus provided by an embodiment of the present disclosure. As a third implementation, as illustrated in FIG. 4, the at least one other functional module includes a system functional module for driving the T/CON functional module.

A first functional module for providing signals for a gate line drive IC and a second functional module for providing signals for a data line drive IC in the display apparatus are electrically connected with the T/CON functional module on the printed circuit board.

In this way, the T/CON functional module and the system functional module for driving the T/CON functional module in the display apparatus are integrated into one printed circuit board, so that there is no need to establish a connection via any FPC between the T/CON functional module and the system functional module, improving the reliability. The number of peripheral circuit boards of the display apparatus is decreased and the length of the power supply line from the display panel of the display apparatus to the BLU of a power functional module is shorten as compared with the known solution in which the T/CON functional module and the system functional module are respectively arranged on different carriers.

In this way, the first functional module for providing the signals for the gate line drive IC, the second functional module for providing the signals for the data line drive IC and the power functional module for providing operating voltages in the display apparatus are arranged on different printed circuit boards respectively.

Figure 5:
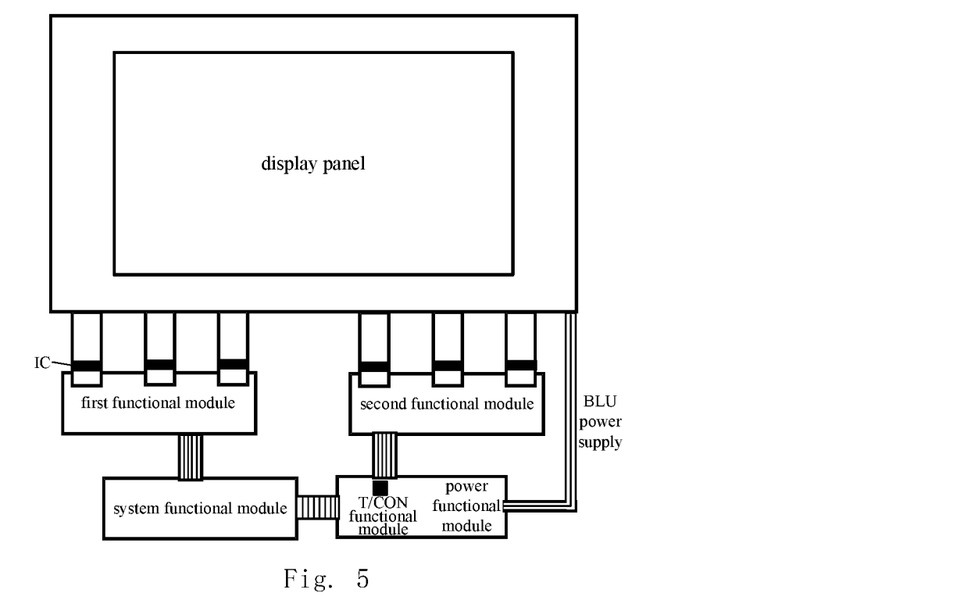
FIG. 5 is a schematic diagram of the structure of a fourth display apparatus provided by an embodiment of the present disclosure.

FIG. 5 is a schematic diagram of the structure of a fourth display apparatus provided by an embodiment of the present disclosure. As a fourth implementation, as illustrated in FIG. 5, the at least one other functional module includes a power functional module for providing operating voltages.

A first functional module for providing signals for a gate line drive IC, a second functional module for providing signals for a data line drive IC and a system functional module for driving the T/CON functional module in the display apparatus are electrically connected with the T/CON functional module on the printed circuit board respectively.

In this way, the T/CON functional module and the power functional module for providing the operating voltages in the display apparatus are integrated into one printed circuit board. The number of peripheral circuit boards of the display apparatus is decreased and the length of the power supply line from the display panel of the display apparatus to the BLU of a power functional module is shorten as compared with the known solution in which the T/CON functional module and the power functional module are respectively arranged on different printed circuit boards.

In this way, the first functional module for providing the signals for the gate line drive IC, the second functional module for providing the signals for the data line drive IC and the system functional module for driving the T/CON functional module in the display apparatus are arranged on different printed circuit boards respectively.

Figure 6:
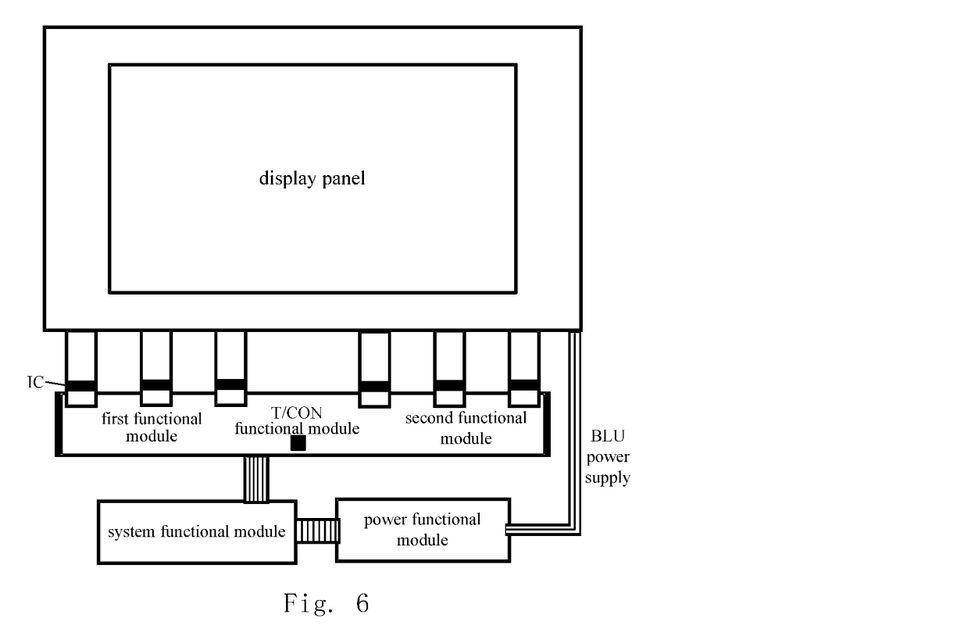
FIG. 6 is a schematic diagram of the structure of a fifth display apparatus provided by an embodiment of the present disclosure.

FIG. 6 is a schematic diagram of the structure of a fifth display apparatus provided by an embodiment of the present disclosure. As a fifth implementation, as illustrated in FIG. 6, the at least one other functional module includes a first functional module for providing signals for a gate line drive IC and a second functional module for providing signals for a data line drive IC.

A system functional module for driving the T/CON functional module in the display apparatus is electrically connected with the T/CON functional module on the printed circuit board.

In this way, the T/CON functional module, the first functional module for providing the signals for the gate line drive IC and the second functional module for providing the signals for the data line drive IC in the display apparatus are integrated into one printed circuit board, so that there is no need to establish a connection via any FPC between the T/CON functional module and the first functional module and the second functional module, improving the reliability. The number of peripheral circuit boards of the display apparatus is decreased and the length of the power supply line from the display panel of the display apparatus to the BLU of a power functional module is shorten as compared with the known solution in which the T/CON functional module, the first functional module and the second functional module are respectively arranged on different printed circuit boards.

In this way, the system functional module for driving the T/CON functional module and the power functional module for providing the operating voltages in the display apparatus are arranged on different printed circuit boards respectively.

Figure 7:
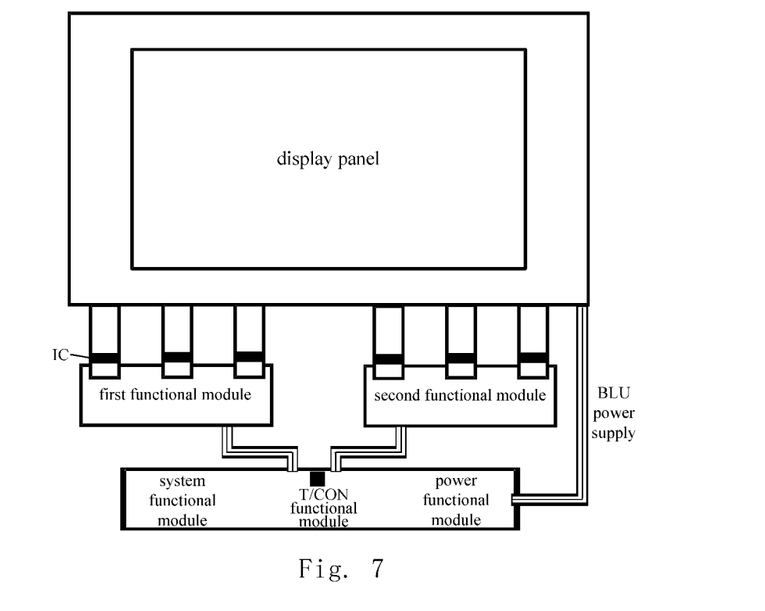
FIG. 7 is a schematic diagram of the structure of a sixth display apparatus provided by an embodiment of the present disclosure.

FIG. 7 is a schematic diagram of the structure of a sixth display apparatus provided by an embodiment of the present disclosure. As a sixth implementation, as illustrated in FIG. 7, the at least one other functional module includes a system functional module for driving the T/CON functional module and a power functional module for providing operating voltages.

A first functional module for providing signals for a gate line drive IC and a second functional module for providing signals for a data line driving IC in the display apparatus are electrically connected with the T/CON functional module on the printed circuit board respectively.

In this way, the T/CON functional module, the system functional module for driving the T/CON functional module and the power functional module for providing the operating voltages in the display apparatus are integrated into one printed circuit board, so that there is no need to establish the connection via any FPC between the T/CON functional module and the system functional module, and between the system functional module and the power functional module, improving the reliability. The number of peripheral circuit boards of the display apparatus is decreased and the length of the power supply line from the display panel of the display apparatus to the BLU of a power functional module is shorten as compared with the known solution in which the T/CON functional module, the system functional module and the power functional module are respectively arranged on different printed circuit boards.

In this way, the first functional module for providing signals for a gate line drive IC and the second functional module for providing the signals for a data line drive IC in the display apparatus are arranged on different printed circuit boards respectively.

Figure 8:
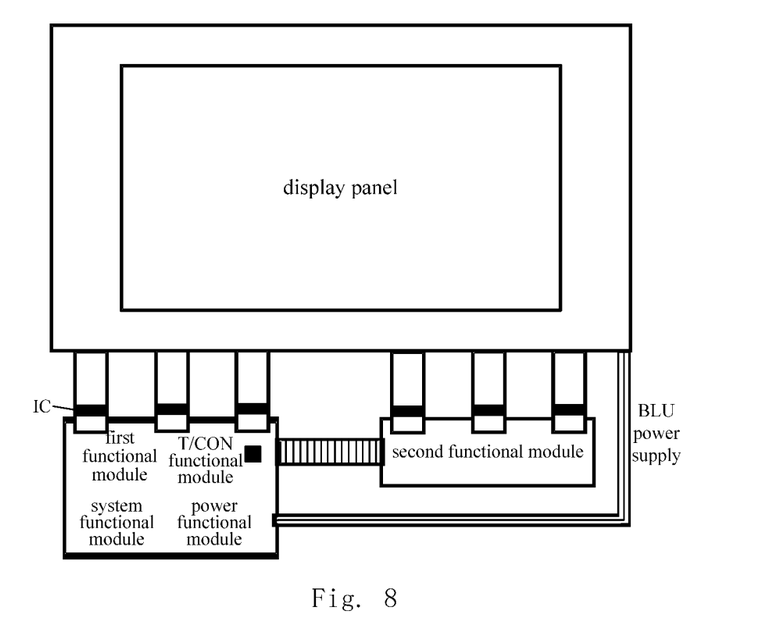
FIG. 8 is a schematic diagram of the structure of a seventh display apparatus provided by an embodiment of the present disclosure.

FIG. 8 is a schematic diagram of the structure of a seventh display apparatus provided by an embodiment of the present disclosure. As a seventh implementation, as illustrated in FIG. 8, the at least one other functional module includes a first functional module for providing signals for a gate line drive IC, a system functional module for driving the T/CON functional module and a power functional module for providing operating voltages.

A second functional module for providing signals for a data line drive IC in the display apparatus is electrically connected with the T/CON functional module on the printed circuit board.

In this way, the T/CON functional module, the first functional module for providing the signals for the gate line drive IC, the system functional module for driving the T/CON functional module and the power functional module for providing the operating voltages in the display apparatus are integrated into one printed circuit board, so that there is no need to establish the connection via any FPC between the T/CON functional module and the first functional module, between the T/CON functional module and the system functional module and between the system functional module and the power functional module, improving the reliability. The number of peripheral circuit boards of the display apparatus is decreased and the length of the power supply line from the display panel of the display apparatus to the BLU of a power functional module is shorten as compared with the known solution in which the T/CON functional module, the first functional module, the system functional module and the power functional module are respectively arranged on different printed circuit boards.

In this way, the second functional module for providing the signals for a data line drive IC in the display apparatus is arranged on another printed circuit board.

Figure 9:
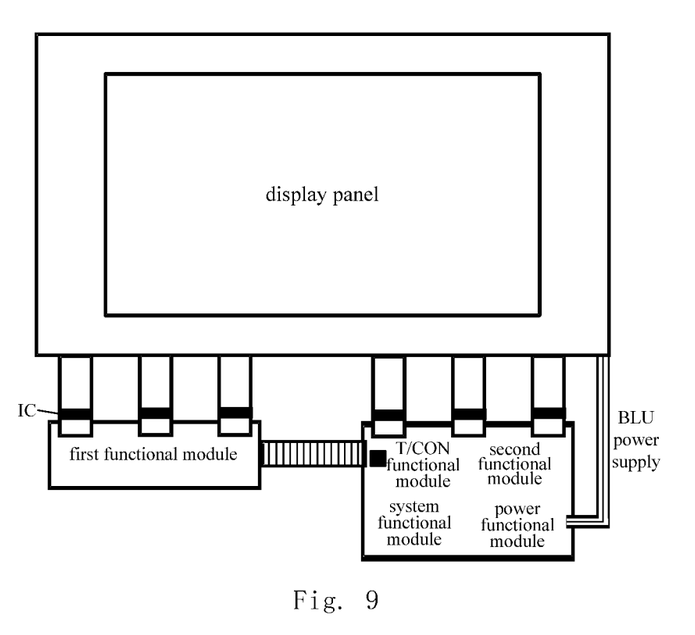
FIG. 9 is a schematic diagram of the structure of an eighth display apparatus provided by an embodiment of the present disclosure.

FIG. 9 is a schematic diagram of the structure of an eighth display apparatus provided by an embodiment of the present disclosure. As an eighth implementation, as illustrated in FIG. 9, the at least one other functional module includes a second functional module for providing signals for a data line drive IC, a system functional module for driving the T/CON functional module and a power functional module for providing operating voltages.

A first functional module for providing signals for a gate line drive IC in the display apparatus is electrically connected with the T/CON functional module on the printed circuit board.

In this way, the T/CON functional module, the second functional module for providing the signals for the data line drive IC, the system functional module for driving the T/CON functional module and the power functional module for providing the operating voltages in the display apparatus are all integrated into one printed circuit board, so that there is no need to establish the connection via any FPC between the T/CON functional module and the second functional module, between the T/CON functional module and the system functional module and between the system functional module and the power functional module, improving the connection reliability. The number of peripheral circuit boards of the display apparatus is decreased and the length of the power supply line from the display panel of the display apparatus to the BLU of a power functional module is shorten as compared with the known solution in which the T/CON functional module, the second functional module, the system functional module and the power functional module are respectively arranged on different printed circuit boards.

In this way, the first functional module for providing the signals for a gate line drive IC in the display apparatus is arranged on another printed circuit board.

Figure 10:
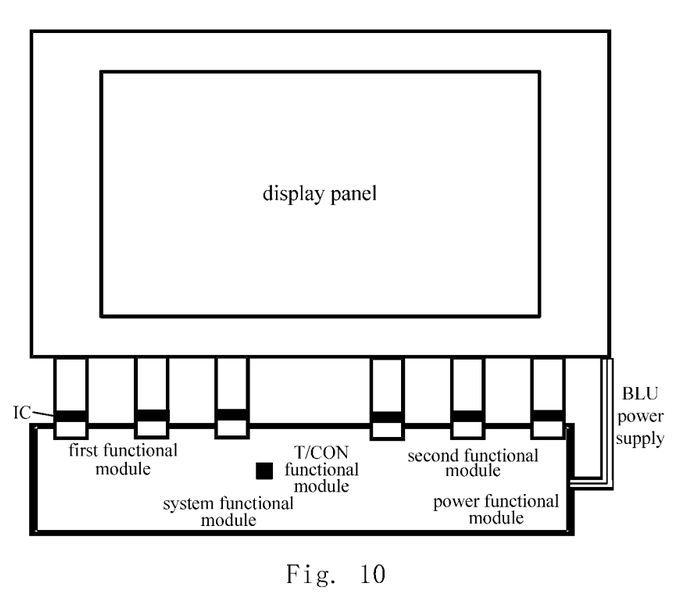
FIG. 10 is a schematic diagram of the structure of a ninth display apparatus provided by an embodiment of the present disclosure.

FIG. 10 is a schematic diagram of the structure of a ninth display apparatus provided by an embodiment of the present disclosure. As a ninth implementation, as illustrated in FIG. 10, the at least one other functional module includes a first functional module for providing signals for a gate line drive IC, a second functional module for providing signals for a data line drive IC, a system functional module for driving the T/CON functional module and a power functional module for providing operating voltages.

In this way, the T/CON functional module, the first functional module for providing the signals for the gate line drive IC, the second functional module for providing the signals for the data line drive IC, the system functional module for driving the T/CON functional module and the power functional module for providing the operating voltages in the display apparatus are all integrated into one printed circuit board, so that there is no need to establish the connection via any FPC between the T/CON functional module and the first functional module, between the T/CON functional module and the second functional module, between the T/CON functional module and the system functional module, and between the system functional module and the power functional module, improving the connection reliability. The number of peripheral circuit boards of the display apparatus is decreased and the length of the power supply line from the display panel of the display apparatus to the BLU of a power functional module is shorten as compared with the known solution in which the T/CON functional module, the first functional module, the second functional module, the system functional module and the power functional module are respectively arranged on different printed circuit boards.

It should be noted that, in the embodiments of the present disclosure, the position of the first functional module for providing the signals for the gate line drive IC is set according to the position of the gate line drive IC and the position of the second functional module for providing the signals for the data line drive IC is set according to the position of the data line drive IC. In general, the first functional module is located on the edge of the display panel of the display apparatus while the second function module is located at the bottom of the display panel of the display apparatus. Of course, in a specific implementation, both the first functional module and the second functional module may be located at the bottom of the display panel. The embodiments of the present disclosure do not limit the specific positions of the first functional module and the second functional module.

The display apparatuses provided by the embodiments of the present disclosure may be any product or means having a display function, such as a liquid crystal display panel, electronic paper, an Organic Light Emitting Diode (OLED) panel, a mobile phone, a tablet computer, a TV set, a display, a notebook computer, a digital photo frame, a navigator, etc.

Although preferred embodiments of the present disclosure have been described, those skilled in the art may make additional alterations and modifications to such embodiments once they know the basic inventive concept. Thus, the attached claims is intended to be construed as including the preferred embodiments and all of the alterations and modifications falling into the scope of the present disclosure.

Obviously, those skilled in the art may make a variety of changes and variations to the present disclosure without departing from the spirit and scope of the present disclosure. In this way, provided that such changes and variations to the present disclosure belong to the scope of claims of the present disclosure and the equivalent techniques thereof, the present disclosure is intended to cover such changes and variations.

The present application claims the priority of a Chinese patent application No. 201520003223.3 submitted on Jan. 4, 2015, the full content disclosed by which is referenced hereby as a part of the present application.

What is claimed is:

1. A display apparatus comprising a T/CON functional module for providing a timing control, wherein
the T/CON functional module and at least one other functional module in the display apparatus are integrated into one printed circuit board,
wherein the at least one other functional module comprises at least one of a first functional module for providing signals for a gate line drive IC, a second functional module for providing signals for a data line drive IC, a system functional module for driving the T/CON functional module and a power functional module for providing operating voltages.

2. The display apparatus according to claim 1, wherein the at least one other functional module comprises the first functional module for providing signals for a gate line drive IC,
wherein the second functional module for providing signals for a data line drive IC and the system functional module for driving the T/CON functional module in the display apparatus are electrically connected with the T/CON functional module on the printed circuit board.

3. The display apparatus according to claim 1, wherein the at least one other functional module comprises the second functional module for providing signals for a data line drive IC;
wherein the first functional module for providing signals for a gate line drive IC and the system functional module for driving the T/CON functional module in the display apparatus are electrically connected with the T/CON functional module on the printed circuit board.

4. The display apparatus according to claim 1, wherein the at least one other functional module comprises the system functional module for driving the T/CON functional module;
wherein the first functional module for providing signals for a gate line drive IC and the second functional module for providing signals for a data line drive IC in the display apparatus are electrically connected with the T/CON functional module on the printed circuit board.

5. The display apparatus according to claim 1, wherein the at least one other functional module comprises the power functional module for providing operating voltages;
wherein the first functional module for providing signals for a gate line drive IC, a the second functional module for providing signals for a data line drive IC and the system functional module for driving the T/CON functional module in the display apparatus are electrically connected with the T/CON functional module on the printed circuit board.

6. The display apparatus according to claim 1, wherein the at least one other functional module comprises the first functional module for providing signals for a gate line drive IC and the second functional module for providing signals for a data line drive IC;
wherein the system functional module for driving the T/CON functional module in the display apparatus is electrically connected with the T/CON functional module on the printed circuit board.

7. The display apparatus according to claim 1, wherein the at least one other functional module comprises the system functional module for driving the T/CON functional module and the power functional module for providing operating voltages;
wherein the first functional module for providing signals for a gate line drive IC and the second functional module for providing signals for a data line driving IC in the display apparatus are electrically connected with the T/CON functional module on the printed circuit board.

8. The display apparatus according to claim 1, wherein the at least one other functional module comprises the first functional module for providing signals for a gate line drive IC, the system functional module for driving the T/CON functional module and the power functional module for providing operating voltages;
wherein the second functional module for providing signals for a data line drive IC in the display apparatus is electrically connected with the T/CON functional module on the printed circuit board.

9. The display apparatus according to claim 1, wherein the at least one other functional module comprises the second functional module for providing signals for a data line drive IC, the system functional module for driving the T/CON functional module and the power functional module for providing operating voltages;
wherein the first functional module for providing signals for a gate line drive IC in the display apparatus is electrically connected with the T/CON functional module on the printed circuit board.

10. The display apparatus according to claim 1, wherein the at least one other functional module comprises the first functional module for providing signals for a gate line drive IC, the second functional module for providing signals for a data line drive IC, the system functional module for driving the T/CON functional module and the power functional module for providing operating voltages.

* * * * *